Nov. 17, 1964  A. R. SMREK  3,157,214
BARREL ASSEMBLY JIG
Filed Dec. 31, 1962  4 Sheets-Sheet 1
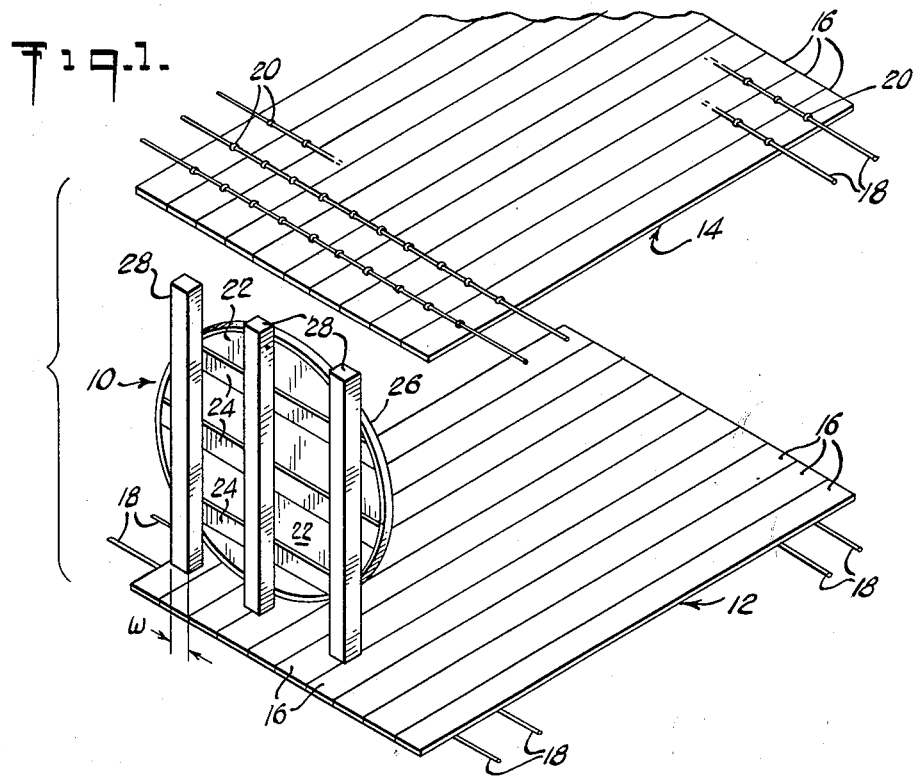
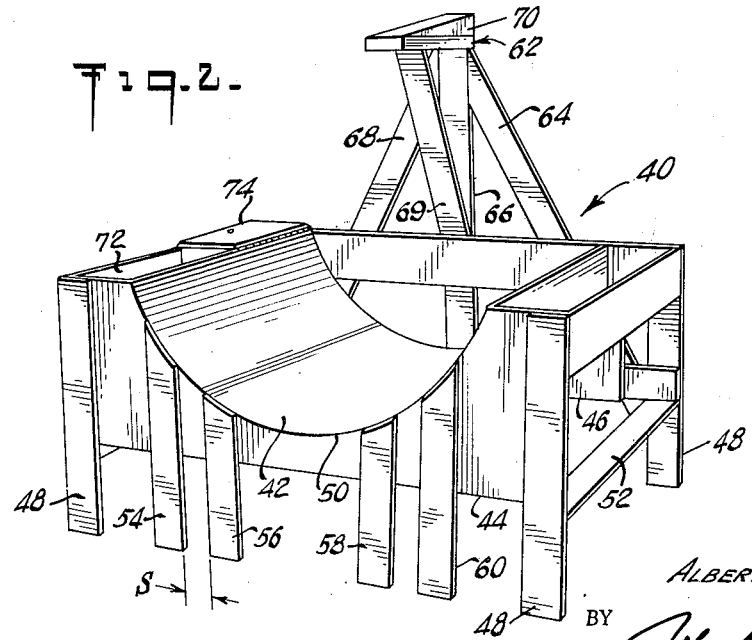
INVENTOR.
ALBERT R. SMREK
BY
John R. McKinney
ATTORNEY

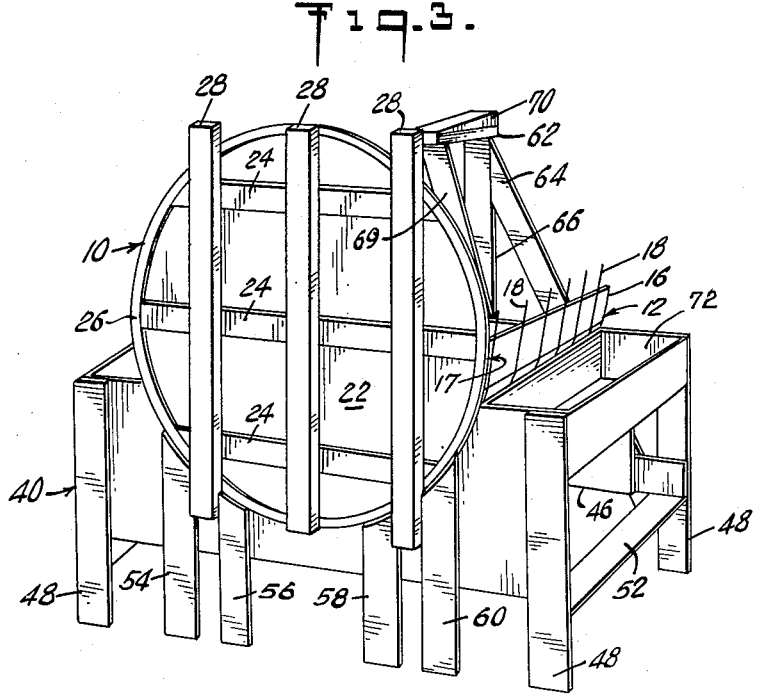
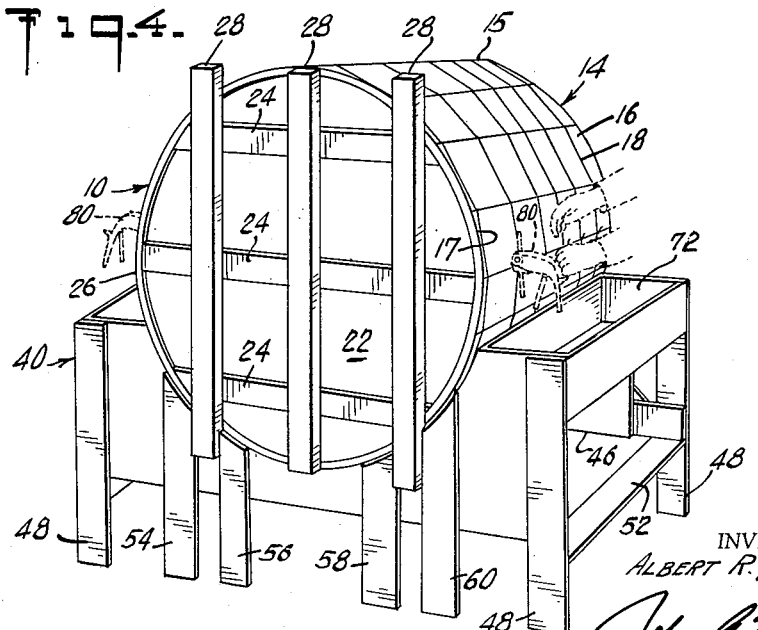

Nov. 17, 1964 A. R. SMREK 3,157,214
BARREL ASSEMBLY JIG
Filed Dec. 31, 1962 4 Sheets-Sheet 3
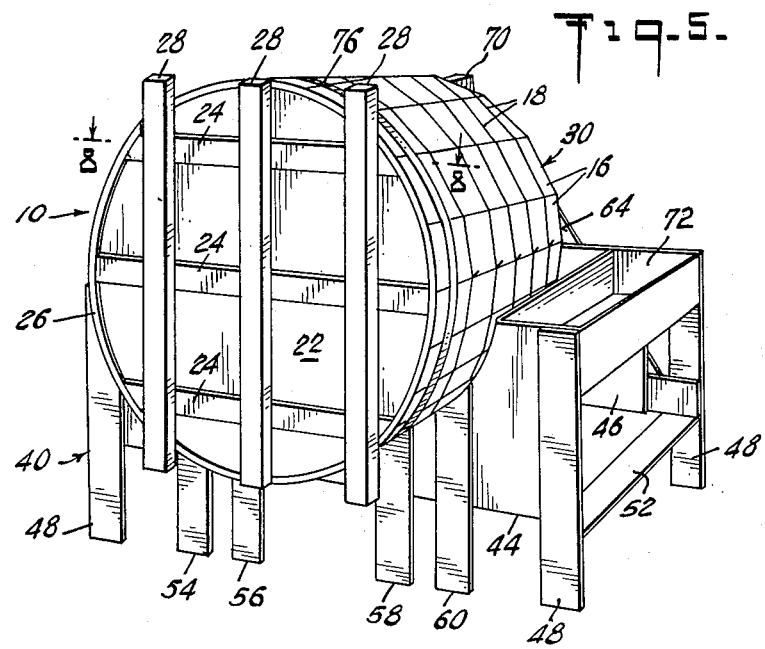
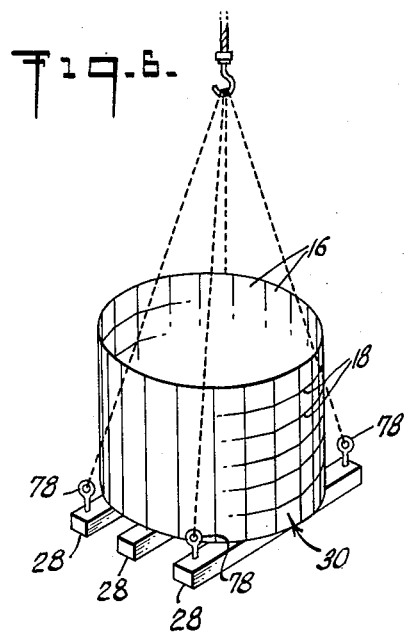
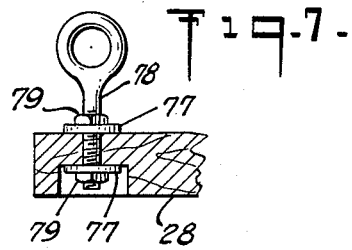
INVENTOR.
ALBERT R. SMREK
BY
ATTORNEY Nov. 17, 1964  A. R. SMREK  3,157,214
BARREL ASSEMBLY JIG
Filed Dec. 31, 1962  4 Sheets-Sheet 4

INVENTOR.
ALBERT R. SMREK
BY
ATTORNEY

United States Patent Office 3,157,214
Patented Nov. 17, 1964

3,157,214
BARREL ASSEMBLY JIG
Albert R. Smrek, Vienna, W. Va., assignor to Johns-Manville Corporation, New York, N.Y., a corporation of New York
Filed Dec. 31, 1962, Ser. No. 248,433
6 Claims. (Cl. 147—3)

This invention relates generally to the construction of large bulk containers. More particularly, it relates to a jig to facilitate the assembly of staves and a base portion to construct a large-type barrel.

In a great many continuous production operations, it is desirable to provide temporary large containers to temporarily retain bulk material used in the continuous operation while some of the equipment may be shut down for repairs. One such operation is the manufacture of glass marbles used in the production of glass fibers. Periodically, the furnace in which the glass marbles are formed is shut down for repairs. Hence, in order to continue production in the rest of the line, it is neceessary to stock material in advance of such shut downs. Aggregate materials, such as glass marbles, are relatively heavy. Hence, it is desirable to provide a container which will not only support a great load, but one which may be easily moved about the manufacturing plant by mechanical means. Consequently, it is desirable to provide the containers with skids integrally attached thereto. Further, the containers used in storing such aggregate material do not necessarily have to be made according to the rigid standards that hogsheads, which normally contain liqud materials, have to be made. Consequently, the assembly jigs do not need to be as elaborate or as expensive as those employed in assembling hogsheads.

Therefore, it is an object of this invention to provide new and improved, more simple and facile, method and apparatus for assembling components into barrels.

Another object of this invention is to provide method and apparatus for assembling barrel components including a skid portion affixed to the base of the barrel.

Still another object of this invention is to provide method and apparatus whereby one individual can assemble a large bulk container.

A preferred embodiment of the apparatus of this invention is adapted to be used in conjunction with a barrel comprising preassembled components including a base portion having skids attached thereto and preassembled units of staves interconnected, as with wire, to form a series. In accordance with the invention, a first series of staves is positioned in the cradle portion of the jig of this invention, which cradled portion is supported by the framework. The cradle portion is of such a configuration as to substantially correspond to the periphery of the barrel to be constructed. Adjacent one end of the cradle are positioned vertically disposed members arranged in pairs, the members in each pair being spaced to receive therebetween and position the skid portions of the barrel base. The base may comprise a channeled metallic rim for receiving the ends of the staves. A second series of interconnected staves is then positioned upon an elevated platform, which platform includes a movable member for adjustably applying tension to the free end of the upper stave section and so that the upper stave section will assume generally the configuration of a cylinder. Tension is then applied to one or more sets of wires or bands of the stave sections to bring the stave sections together. The ends of the corresponding wires or bands are then secured together as by bending and twisting. Optionally, the staves may then also be more fixedly secured to the base by nailing. The completed assembly is then partially removed from the jig to provide a cantilevered or overhanging portion around which one or more strap bands may optionally be placed. The barrel assembly just described is adapted to be transported by fork-lift trucks. Optionally, eye bolts may be placed at the corners of the outer skids while the barrel is in the partially removed position on the jig to provide means for fastening a chain to facilitate lifting and handling by a crane.

Further objects and advantages of this invention will appear from the following description of species thereof and from the accompanying drawings.

FIG. 1 is an exploded pictorial view of the barrel components contemplated to be assembled by the apparatus of this invention;

FIG. 2 is a pictorial view of a jig embodiment contemplated by this invention;

FIG. 3 is a pictorial view showing some of the components of FIG. 1 positioned within the jig of FIG. 2;

FIG. 4 is a view similar to FIG. 3 showing the completed barrel assembly positioned within the jig;

FIG. 5 is a view similar to FIG. 4 showing the barrel assembly partially removed from the jig to facilitate a placing of a band therearound;

FIG. 6 is a pictorial view of an assembled barrel in an upright position together with alternate means for lifting the barrel;

FIG. 7 is an enlarged fragmentary view of the alternate lifting means shown in FIG. 6;

Figures 9, 10:
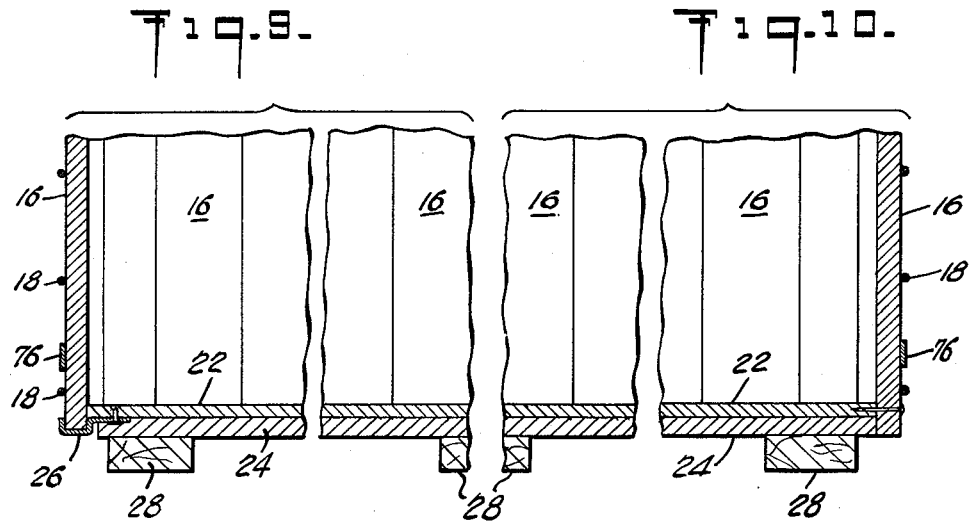
FIGS. 9 and 10 are fragmentary cross-sectional elevational views of forms of base construction which may be advantageously employed with this invention.

Referring to the drawings, the numeral 10 indicates generally the base component of the barrel being made while first and second stave assemblies are designated by the numerals 12 and 14, respectively. The individual staves 16 of each assembly 12 and 14 are shown to be secured together by means of wires 18 and staples 20. While the staves are shown to be generally in contiguous relation they may be spaced apart a distance less than the smallest dimension of the parts to be contained. The base 10 may comprise a wall 22 reinforced by members 24 and circumposed by metal rim 26, and a plurality of spaced apart skid rails 28 for further reinforcing the wall 22 and for providing means to facilitate elevation of the assembled barrel 30 during use thereof.

Referring to FIG. 2, the jig 40 thereshown comprises a cradle 42 disposed generally horizontally and preferred being of metal to resist wear. The cradle 42 is generally semi-cylindrical in form to correspond substantially to the generally cylindrical form of the barrel 30 to be formed. Actually, the assembled barrel may be polygonal in form. The jig 40 includes traverse members 44 and 46 elevated and supported by legs 48. The traverse members 44 and 46 have generally arcuate portions 50 corresponding to the designed configuration of the cradle 42. The transverse members 44 and 46 and legs 48 are maintained in spaced apart rigid position by cross-braces 52. All of the components of the jig 40 are secured together by any suitable means such as screws, bolts or nails.

Adjacent one end, which may be considered the front, of the cradle 42 are disposed positioning members 54, 56, 58 and 60, arranged in pairs to receive and position therebetween one or more of the skid rails 28. Members 54 and 56 may be considered a first pair, and members 58 and 60 may be considered a second pair, each member of a pair being spaced from the other member of the pair a distance corresponding substantially to the width W of a skid rail. Preferably the space S is just slightly less than the width W to create an interference fit when a skid rail 28 is positioned in the space S and consequently wedge the skid rail 28 in place.

It should be noted that the base 10 through its skid rails 28 may be wedged between any arrangement of positioning members wherein there is at least one positioning member for deterring clockwise movement of the base 10 when placed in the cradle and at least one positioning member for preventing counterclockwise movement of the base 10. Consequently, either of the first or second pairs will suffice for assembling some barrels. Further in this respect, positioning members 54 and 60, cooperatively, may be considered a pair; also, positioning members 56 and 58, cooperatively, may be considered a pair. While the positioning members 54, 56, 58 and 60 have been shown to extend in a generally vertical direction and to the floor, it will become apparent that the positioning members may extend at an angle from the vertical direction and that they need be only sufficiently long to wedge the skid rail 28 and deter the rotation of the base 10.

Adjacent the opposite end to that receiving the base 10, or what may be termed the back end of the cradle 42 is an elevated platform 62 suitably supported by members 64, 66, 68 and 69. The platform 62 includes an adjustably positionable wedge member 70 for a purpose hereinafter to be described.

Optionally, bins 72 and table top 74 may be provided for supporting and storing of tools and supplies.

In operation, a first or bottom series of staves 12 interconnected with wire 18 is center-positioned in the cradle 42, with the wire 18 bottom side. A base 10 is then inserted in the jig 40 with the rim 26 in engagement with the terminal portion of the staves 16 of series 12 and with the skid rails 28 positioned between pairs of positioning members 54, 56, 58 and 60 as shown in FIG. 3. A second or top series of staves 14 is then positioned with the terminal portions 17 of staves 16 near base 10 engaging the rim 26 and with one or more of the terminal portions 15 of staves 16 at the opposite end being supported by platform 62. The wedge member 70 is suitably positioned to move the top series of staves 14 to the proper height for the diameter of the barrel 30 being formed. The wires 18 are at this time in an untightened position. Well known and commercially available wire pullers 80, in pairs, are placed diametrically opposite each other to apply tension to one or more sets of wires 18 (FIG. 4), a set being two cooperatively arranged half-loops. The application of tension to one or more sets of wires serves to pull the staves 16 to the desired positions and firmly fix the staves 16 while the remaining sets of wires are bent and twisted into securing position. Optionally, one or more of the staves 16 may then be more firmly secured to the base 10 by nailing. The wire pullers 80 are then removed and the corresponding wires bent and twisted. The wedge 70 is then released and the assembled barrel 30 pulled out for use. Optionally, one or more bands 76 is to be placed around the staves 16 where the assembled barrel 30 is in a partially pulled out position (FIG. 5).

The barrel assembly 30 described above is adapted to by transported by fork-lift trucks. The skid rails 28 may be optionally provided with eye bolts 78, suitably secured with washers 77 and nuts 79, as generally shown in FIG. 6 and as shown in greater detail in FIG. 7 to provide means to facilitate lifting and handling by a crane.

Figure 8:
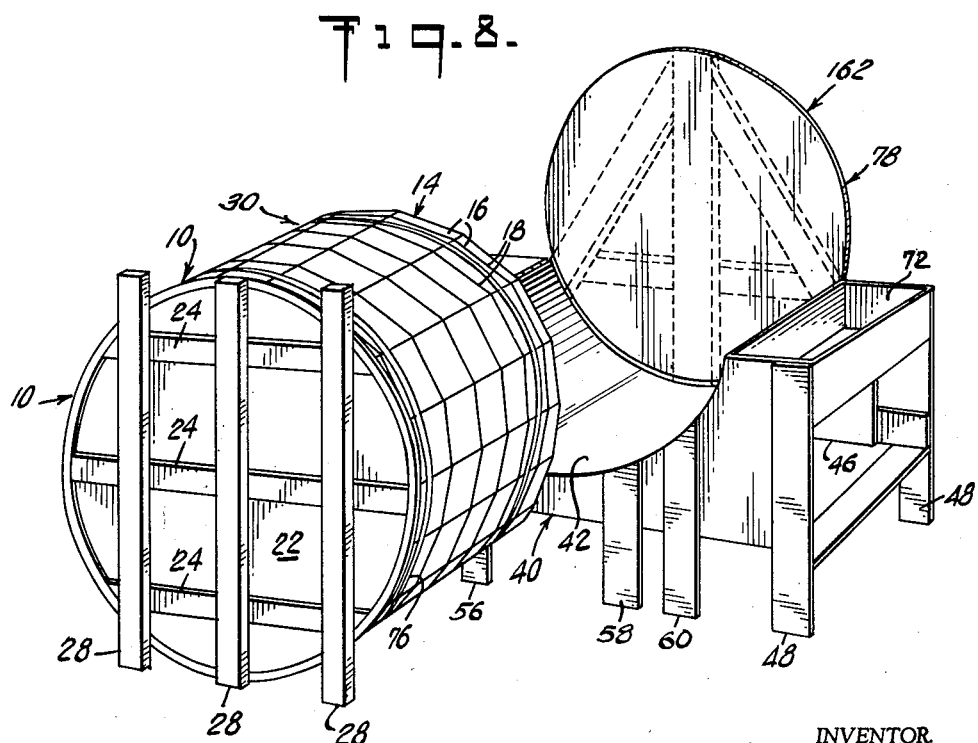
FIG. 8 is a pictorial view of a modified form of jig.

In FIG. 8 is illustrated an alternate form of platform or support 162 for retaining the top stave assembly 14 during the assembling operation. The platform 162 is shown to include a support 78 in the form of a circle corresponding to the internal diameter of the barrel to be formed. However, only the top half of the circular support 78 is required. Consequently, the support 78 may be modified to be in the form of a semi-circle.

FIG. 9 illustrates a form of barrel construction which employs a metal rim in the base portion 4 which may be successfully assembled in the jig of this invention. The rim 26 is sandwiched between the wall 22 and the reinforcing members 24.

In FIG. 10 is illustrated a barrel construction wherein the staves are nailed directly to the base wall 22 and consequently the metal rim 26 of FIG. 9 may be omitted.

It will be apparent that the instant invention provides simple, efficient means for forming barrel assemblies. The assembly of a barrel approximately 40 inches in diameter and approximately 40 inches high previously required 30 minutes and two men (total time—1 hour). Through the use of the preferred embodiment jig of this invention, one man can assemble such a barrel in 15 minutes. The savings in expenditure of time, labor and cost in assembling barrels of the type described makes it more feasible to dismantle empty barrels for shipment and reuse.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. A jig for forming barrels from stave sections and a base, said base having skids affixed thereto, comprising: a framework including a cradle, said cradle forming lower stave supporting means; upstanding members positioned adjacently of one end of said cradle, said members being arranged in pairs with the members of each pair being spaced to receive and retain therebetween the skid portions of said base; and elevated upper stave support means at the opposite end of said cradle.

2. A jig for assembling sections of barrels together including a base portion having transverse reinforcing members, comprising: a cradle for supporting a first series of staves; a frame supporting said cradle in an elevated position; said frame including transverse and cross-brace members; positioning members arranged in pairs at one end of said cradle and being secured to a transverse member of said frame, the positioning members in a pair being spaced apart a distance substantially equal to the width of one of said reinforcing members of said base portion, the positioning members being spaced to wedge the reinforcing members of the base portion when placed on said jig and maintain said base in a substantially fixed position during the assembly operation; and an elevated stave supporting member at the opposite end of said cradle for supporting at least one of a second series of staves in spaced relation from the bottommost staves of said first series a distance corresponding to the diameter of the barrel being formed.

3. A jig for assembling sections of barrels together, said sections including a base member having transverse members secured thereto, and a plurality of preassembled stave units, comprising: an arcuately shaped metal cradle for receiving and supporting a first stave section during the assembly operation; spaced positioning members at one end of said cradle extending upwardly and being arranged to retain the transverse members therebetween so as to fix the position of the base member during the assembly operation; and an elevated stave supporting member at the opposite end of said cradle and cooperatively arranged with said base member to support at least one stave of a second stave unit temporarily in a fixed position during the assembly operation.

4. Apparatus for assembling sections of barrels having skid portions affixed thereto, comprising: a framework supporting a stave cradle, said cradle forming lower stave supporting means for receiving and supporting a plurality of staves during the assembling operation; vertically disposed positioning members arranged in pairs at one side of said framework, the members in each pair being spaced to receive therebetween and position the skid portions of the barrel base; and upper stave supporting means being affixed to said frame including a movable member for adjustably applying tension to the end of a stave section free from said base.

5. The method of assembling a plurality of barrel sections, including stave sections and a base having skid portions affixed thereto, said stave sections including a plurality of staves interconnected by wires, comprising: positioning a first series of interconnected staves on a generally horizontally disposed stave support; positioning said base into cooperative engagement with said first series of staves with the skid portions being upstandingly positioned in support means adjacent one end of said stave support; positioning a second series of interconnected staves upon the said base; applying tension to the series of the stave sections to bring the sections together; and securing the ends of corresponding wires together to form an integrated stave assembly.

6. The method as described in claim 5, which further comprises: securing the staves to said base and further banding the assembled staves with strip bands.

References Cited in the file of this patent

UNITED STATES PATENTS

| | | |
|---|---|---|
| 811,031 | Brown | Jan. 30, 1906 |
| 860,973 | Gilmour | July 23, 1907 |
| 1,475,305 | McClenny | Nov. 27, 1923 |